United States Patent
Van Huis

[15] 3,700,093
[45] Oct. 24, 1972

[54] TROUGH COUPLER WITH CHAIN GUIDE FOR CHAIN CONVEYOR TYPE ANIMAL FEEDER

[72] Inventor: Robert L. Van Huis, Zeeland, Mich.
[73] Assignee: U.S. Industries, Inc., New York, N.Y.
[22] Filed: Sept. 21, 1970
[21] Appl. No.: 74,081

[52] U.S. Cl. ................................................198/204
[51] Int. Cl. ..............................................B65g 15/60
[58] Field of Search..............198/137, 202, 204, 168; 119/52 R, 51 CF

[56] References Cited

UNITED STATES PATENTS

| | | | |
|---|---|---|---|
| 2,803,334 | 8/1957 | Kitson | 198/204 |
| 3,241,653 | 3/1966 | Van Huis | 198/168 |
| 2,935,930 | 5/1960 | Abrams | 198/137 X |

*Primary Examiner*—Richard E. Aegerter
*Attorney*—Price, Heneveld, Huizenga & Cooper

[57] ABSTRACT

A feeder trough connected in a manner which wedges a chain guide between the trough sections. The chain guide has depending leg portions which extend down between adjacent ends of the trough sections, abutting the same. The leg portions rest upon a specially shaped portion of a connecting section which latter section removably holds the trough sections together by conventional straps.

21 Claims, 5 Drawing Figures

TROUGH COUPLER WITH CHAIN GUIDE FOR CHAIN CONVEYOR TYPE ANIMAL FEEDER

BACKGROUND OF THE INVENTION

Animal feeders such as are utilized for poultry cages conventionally utilize chain conveyors for conveying the feed through the feeder troughs. Such chain conveyors have customarily been guided at various points in the trough by chain guides so that the chain is raised from the surface of the trough and centered therein. This location of the chain with respect to the trough eliminates wear on the trough as well as any tendency of the chain to twist.

It is most convenient to mount the chain guide in connectors which connect long sections of the feed trough at the adjacent ends of the latter. Without this attachment of the chain guide, the chain by its friction could drag the chain guides through the trough. Conventionally, the attachment of the chain guide has been by welding or bolts, processes which have been cumbersome due to the necessity of welding or drilling bolt holes and of individually bolting down each chain guide.

SUMMARY OF THE INVENTION

The disclosure relates to a chain guide which is mounted in a trough system on the connector in such a fashion as to avoid the necessity for bolting down the guide. Specifically, there is provided a chain guide which is fixed to the trough system by its interconnection with the trough sections and the connector, which interconnection is obtained when the trough system is assembled. The chain guide comprises a body especially adapted to pass the chain therethrough in a fashion which centers the chain with respect to the trough, and means for elevating the body above the surface of the trough, the elevating means being especially adapted to accommodate at least one of the interlocking members which makes up the trough system adjacent to the body and spaced from a portion of another of the interlocking members, whereby the chain guide's position with respect to the one interlocking member is fixed. This chain guide provides an improved trough whereby the chain guide's position is fixed with respect to each trough section and the connector which is telescoped with respect to the trough sections.

Furthermore, the presence of and the configuration of the chain guard provided by this invention tends to create a bank of feed in the trough which repeats itself in a wave-like form along the length of the trough. This wave form is a desired characteristic as it facilitates the eating of the feed by the poultry.

Accordingly, it is an object of the invention to provide a chain guide and an improved trough utilizing such a chain guide wherein the guide is fixed with respect to the elements of the trough solely by the interconnections of the trough parts, without the need for bolts or welding.

It is a related object of the invention to provide such a chain guide and such a trough wherein the assembly of the parts is readily accomplished due to the simplified construction of the parts.

Other objects and advantages will become apparent upon reference to the following drawings and detailed discussion.

DESCRIPTION OF THE PREFERRED EMBODIMENTS

Figure 1:
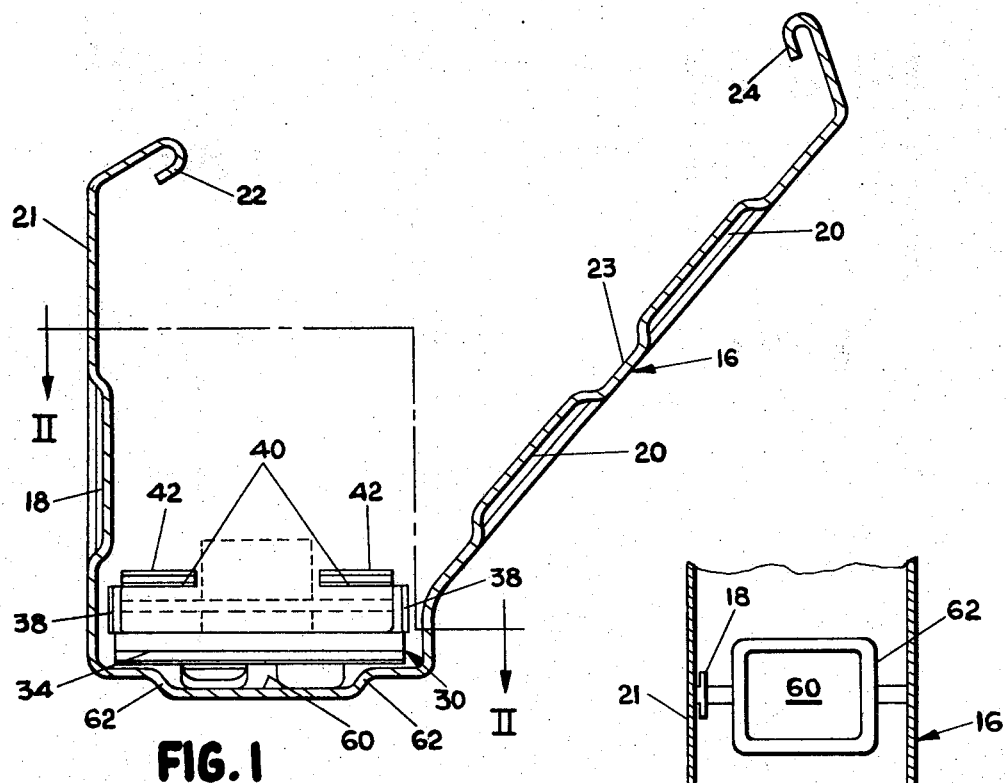
FIG. 1 is an elevational view in section illustrating the chain guide and the trough connector as constructed in accordance with the invention.
Figure 2:
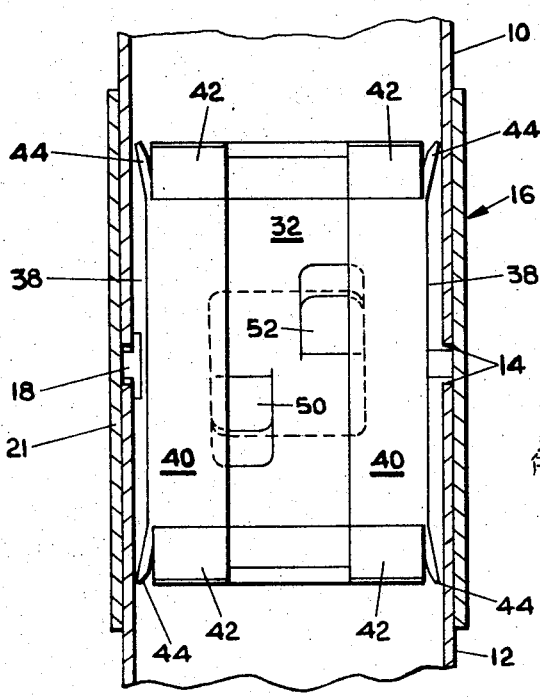
FIG. 2 is a plan view in section taken along the line II—II of FIG. 1 and showing the trough sections added to the connector.
Figure 5:
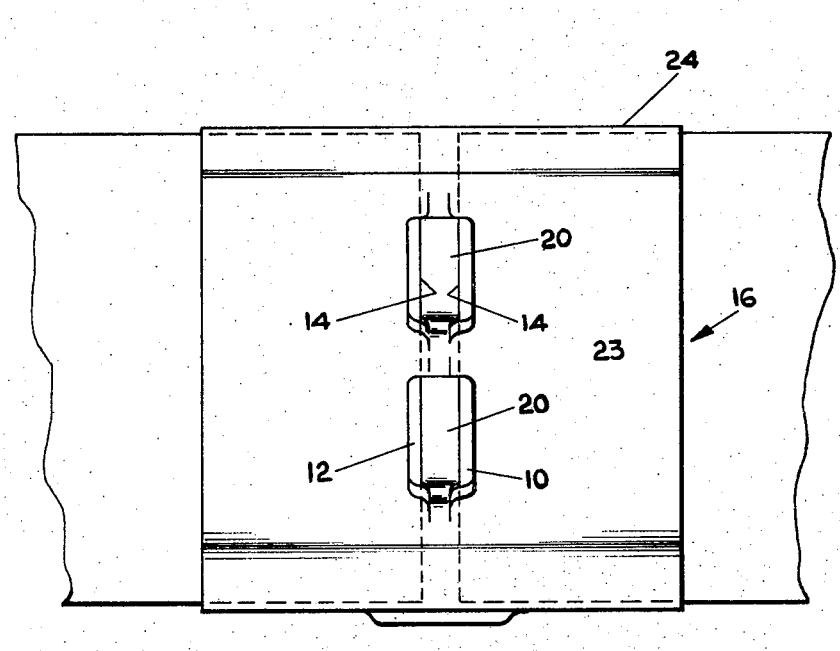
FIG. 5 is a fragmentary side elevational view of the assembled trough system shown in FIG. 2.

The invention involves a conveying system and chain guide utilized therein for the conveying feed in an animal feed trough. Referring to FIGS. 1 and 2, the invention is illustrated in connection with a feeder trough system. It is conventional to mount feeder troughs 10 and 12 with their edges or ends 14 adjacent but spaced from each other, the troughs 10 and 12 being held in this relationship by a connecting trough selection 16. As shown, the connecting trough selection 16 telescopes around the ends or edges 14 of the troughs 10 and 12, but the reverse arrangement is also possible. It is conventional to removably hold the troughs 10 and 12 and the trough section 16 in the relationship shown in FIG. 2 by means of straps 18 and 20. These straps are formed by lancing a generally U-shaped portion from the sides 21 and 23, respectively, out of the trough section 16 (FIG. 1). It will be readily appreciated that the troughs 10 and 12 have the same general cross-sectional shape as the trough connector 16 shown in FIG. 1. Lips 22 and 24 of section 16 serve to confine the top edges 26 of the troughs 10 and 12 (FIGS. 1 and 5).

In accordance with one aspect of the invention, the feed is conveyed through the troughs 10 and 12 in the trough section 16 by means of a chain shown in phantom in FIG. 1, the chain being guided and centered by a chain guide 30 wedged in place in the trough assembly. The chain guide 30 is constructed so as to comprise a chain-contacting surface 32 which has downwardly depending flanges 34 and 36 at the end thereof bent down from the surface 32 to act as a ramp for the chain as it moves up to the surface 32 from either of the troughs 10 and 12. Side walls 38 extend upwardly from the surface 32, these walls serving to center the chain as shown in FIG. 1. The top edges of the side walls 38 are bent back over the surface 32 so as to form rails 40 which limit the vertical motion of the chain as the latter moves through the guide 30. The ends 42 of the rails 40 are bent away from the surface 32, while the ends 44 of the side walls 38 are bent toward the trough sections. These bent ends 42 and 44 serve to enlarge the opening into the chain guide 30 to facilitate movement of the chain therethrough.

Figure 4:
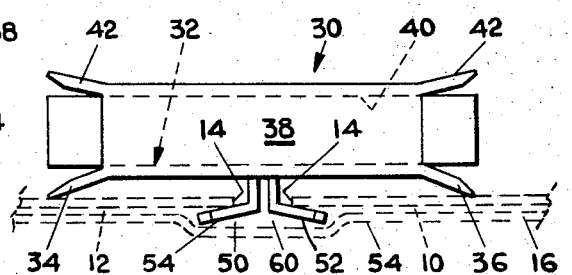
FIG. 4 is a side elevational view of the chain guide shown in FIGS. 1 and 2.

In accordance with another aspect of the invention, a portion of the surface 32 is lanced out and then away therefrom so as to form means for wedging the troughs 10 and 12 against the chain guide. (See FIG. 4.) This is accomplished by lancing out two tabs 50 and 52 in the form of L-shaped legs or clips, the tabs each having a foot portion 54 which is sloped downwardly enough to accommodate the troughs 10 and 12 in a wedged force fit. The flanges 34 and 36 have the additional function of completing the wedging action against the troughs 10 and 12. So that the tabs 50 and 52 abut against the edges 14 of both of the troughs, the tabs are lanced so as to face in opposite directions, i.e., towards the troughs 10 and 12 against which they are abutted. The abutment of the tabs 50 and 52 against the edges 14 thus prevents the guide 30 from moving with respect thereto.

Figure 3:
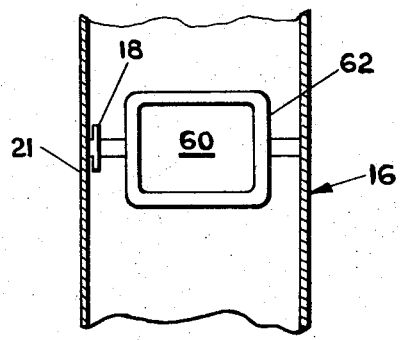
FIG. 3 is a fragmentary sectional view similar to FIG. 2 but illustrating only the connector.

The tabs 50 and 52 are also lanced so as to fit within a rectangular area (the dotted line of FIG. 2) which coincides with a depressed region 60 (FIG. 3) in the connecting trough section 16. The depressed region 60 has sloping sides 62 which define the circumference of that region and which serve to limit the tabs 50 and 52 from movement with respect to the connecting section 16. The chain guide 30 is further prevented from movement with respect to section 16 by reason of the abutment against the edges 14 of the troughs 10 and 12, which troughs are in turn held by the straps 18 and 20 with respect to the connecting section 16.

The troughs are assembled so that the chain guide 30 rests in the depressed region 60 of the connecting section 16, the troughs 10 and 12 then being slipped under the flanges 34 and 36 and into a wedged fit against the foot portions 54 of the tabs 50 and 52. In this assembly, the troughs 10 and 12 are spaced from the depressed region 60. It will be readily appreciated that this assembly is readily accomplished without the use of bolts or the drilling of additional holes, and serves to retain the chain guide 30 in its location at the juncture of the troughs 10 and 12.

The tabs 50 and 52 also serve, along with the flanges 34 and, 36 and 42 to raise the chain contacting surface 23 above the level of the troughs 10 and 12, thereby creating the bank of feed which results in the desired feed ripple formation throughout the trough assembly. The feed ripple effect also provides additional feed above the movement of the chain making it easier for the birds to obtain an adequate amount of feed without having to bring its beak into contact with the chain.

Other forms of the chain guide can be readily constructed, utilizing the wedging feature of the guide. For example, instead of two tabs 50 and 52, a single leg could depend from the surface 32 from which would extend the two foot portions 54. The sole requirement for the construction of the chain guide is that it have a portion which abuts the ends 14 of the troughs 10 and 12 sufficiently to eliminate and prevent movement of the chain guide 30 with respect thereto.

Although the invention has been described in connection with several preferred embodiments, it is not intended that it be limited thereto. Rather, it is intended that it cover all embodiments, equivalent arrangements, and alternate forms as may be included within the scope of the following claims.

The embodiments of the invention in which an exclusive property or privilege is claimed are defined as follows:

1. In a trough having three interconnecting elements including two trough sections positioned with one end of each adjacent, and a connecting trough section telescoped with respect to each of said ends to hold them in said adjacent relationship, and a chain-like conveyor for conveying material through said sections; the improvement comprising a chain guide positioned within said three interconnected elements for raising and centering said chain with respect to the bottom surface of said sections, said guide extending across said adjacent ends and including a chain-contacting surface; and means extending outwardly away from said surface toward one of said trough sections and engageable with one of said sections to form a wedge fit between said connecting trough section and one end of at least one of said trough sections whereby said guide's position with respect to said one of said sections is fixed.

2. In a trough having three interconnecting elements including two trough sections positioned with one end of each adjacent, and a connector telescoped with respect to each of said ends to hold them in said adjacent relationship, and a chain-like conveyor for conveying material through said sections; the improvement comprising a chain guide, said guide including a chain-contacting surface, said guide being wedged within said interconnected elements for raising and centering said chain with respect to the bottom surface of said sections, said guide including means for wedging one of said sections against said guide, whereby said guides positioned with respect to said one of said sections is fixed, said wedging means comprising at least one leg depending from said surface, said leg being bent away from said surface so as to form a first clip, the spacing of said clip from said surface being sufficient to accommodate said one of said sections in a wedged, force fit.

3. The trough as defined in claim 2, wherein said wedging means further includes a second leg spaced from said one leg, said legs being bent away from said surface in opposite directions so that said second leg forms a second clip facing in a direction opposite to that of said first clip, the spacing of said second clip from said surface being sufficient to accommodate the other of said sections spaced from said surface in a wedged, force fit, whereby said guide's position with respect to said other and said one sections is fixed.

4. The trough as defined in claim 3, wherein said connector telescopes along the outside of said sections and further including means for elevating said surface above said connector.

5. The trough as defined in claim 4, wherein said connector includes portions thereof especially adapted to abut against said ends, whereby said connector's position is fixed with respect to said sections and thereby with respect to said guide.

6. A guide for lifting and centering a chain-like conveyor above a surface having two sections assembled with one end of one positioned adjacent to and spaced slightly from one end of the other, and means for connecting said sections so assembled; said guide being characterized in that wedge means are provided for removably mounting said guide across said ends, said wedge means having at least one leg means extending from said guide into said spacing for abutting with and forming a wedge fit between said connecting means and said one end of at least one of said sections so as to be confined against movement with respect thereto, thereby preventing movement of said guide with respect to said one of said sections.

7. The guide as defined in claim 6, wherein said connecting means is shaped to accommodate said leg means in a restricted area.

8. The guide as defined in claim 6, and further including a second leg means similar to said first leg means for abutting with and forming a wedge fit between said connecting means and said one end of said other section an amount sufficient to prevent movement of said guide with respect to said other section.

9. A guide for lifting and centering a chain-like conveyor above and within, respectively, a trough system having two troughs assembled with one end of one positioned adjacent to one end of the other, and means for connecting said troughs so assembled; said guide being characterized by a conveyor-contacting surface spaced above said troughs by wedge means extending downwardly from said surface and intermediate said ends of said troughs, said wedge means forming a wedge engagement between said connecting means and said ends of both of said troughs in said assembled adjacent positions, whereby said guide is removably positioned relative to said troughs when so assembled.

10. A guide for lifting and centering a chain-like conveyor above and within, respectively, a trough system having two troughs assembled with one end of one positioned adjacent to one end of the other, and means for connecting said troughs so assembled; said guide being characterized by means for wedging said guide against said ends of both of said troughs in said assembled adjacent positions, whereby said guide is fixed relative to said troughs when so assembled, said guide including a chain-contacting surface and said wedging means including a portion of said surface bent away therefrom so as to define a leg spaced a sufficient distance from said surface as to wedge against one of said ends, said leg projecting toward the end of said guide adapted to be positioned adjacent to said trough the end of which is wedged by said leg.

11. The guide as defined in claim 10, and further including a second portion of said surface bent away therefrom so as to define a second leg spaced a sufficient distance from said surface as to wedge against the other of said ends, said second leg projecting toward the other end of said guide.

12. The guide as defined in claim 11, wherein one of said bent-away portions is a generally L-shaped tab, the foot of which is spaced from said surface so as to accommodate one of said ends wedged against said guide.

13. The guide as defined in claim 10, wherein said connecting means includes a trough section especially adapted to telescope with respect to said troughs, said section including a portion thereof shaped to accommodate said leg in a confined area.

14. The guide as defined in claim 13, wherein said shaped portion is a depressed region the circumference of which acts to prevent movement of said leg therefrom.

15. A guide for lifting and centering a chain-like conveyor above a surface formed by three interlocking members, said guide comprising a conveying surface, and means for wedging at least one of said interlocking members into a position fixed with respect to said guide which position is spaced from said surface and spaced from a portion of another of said members, said wedging means having at least one leg depending from said surface.

16. The guide as defined in claim 15, wherein said leg is bent away from said surface so as to form a first clip, the spacing of said clip from said surface being sufficient to accommodate said one interlocking member in a wedged, force fit.

17. The guide as defined in claim 16, said wedging means further including a second leg spaced from said one leg, said legs being bent away from said surface in opposite directions so that said second leg forms a second clip facing in a direction opposite to that of said first clip, the spacing of said second clip from said surface being sufficient to accommodate said other of said interlocking members spaced from said surface in a wedged, force fit, whereby said guide's position with respect to said one and said other members is fixed.

18. The guide as defined in claim 15, wherein said other of said interlocking members is a connector and said portion of said other member is a depressed area of said connector, said leg being shaped so as to rest only in said area when wedged against said one interlocking member.

19. A guide for lifting and centering a chain-like conveyor above the surface of a feed trough system, said guide comprising: a general box-like configuration having a bottom chain contacting surface; a pair of generally upstanding sidewalls, said sidewalls being bent back over the chain contacting surface to form a pair of rails which limit the vertical movement of said chain, said rails being spaced from each other to permit free movement of feed along said conveyor while at the same time creating a partial barrier to the flow of feed through the guide so that periodic banks of feed are caused by the flow of feed through and around said guide causing a wave-like formation throughout the trough assembly.

20. The guide according to claim 19 wherein the mouth of said guide is formed by bent portions defined by bending back the edges of said rails away from said surface, bending back the ends of said sides towards the trough, and bending said chain contacting surface downwardly to form a flange portion at the end thereof, said bent portion facilitating movement of the chain through the guide and in addition facilitated the creation of said wave-like formation by increasing the cross-sectional area of obstruction to the flow of feed through the trough.

21. The guide according to claim 20 wherein both ends of said guide are comprised of said bent portions so that said guide is symmetrical about its lateral axis and said wave-like formation is created regardless of the direction of movement of said chain conveyor through said guide.

* * * * *

PO-1050
(5/69)

UNITED STATES PATENT OFFICE
CERTIFICATE OF CORRECTION

Patent No. 3,700,093     Dated  October 24, 1973

Inventor(s)  Robert L. Van Huis

It is certified that error appears in the above-identified patent and that said Letters Patent are hereby corrected as shown below:

Column 2, line 25;

"selection" should be ---section---;

Column 2, line 26;

"selection" should be ---section---;

Column 3, line 36;

"34 and, 36 and 42" should be

---34, 36 and 42---.

Signed and sealed this 3rd day of July 1973.

(SEAL)
Attest:

EDWARD M. FLETCHER, JR.
Attesting Officer

Rene Tegtmeyer
Acting Commissioner of Patents